Figure 1:
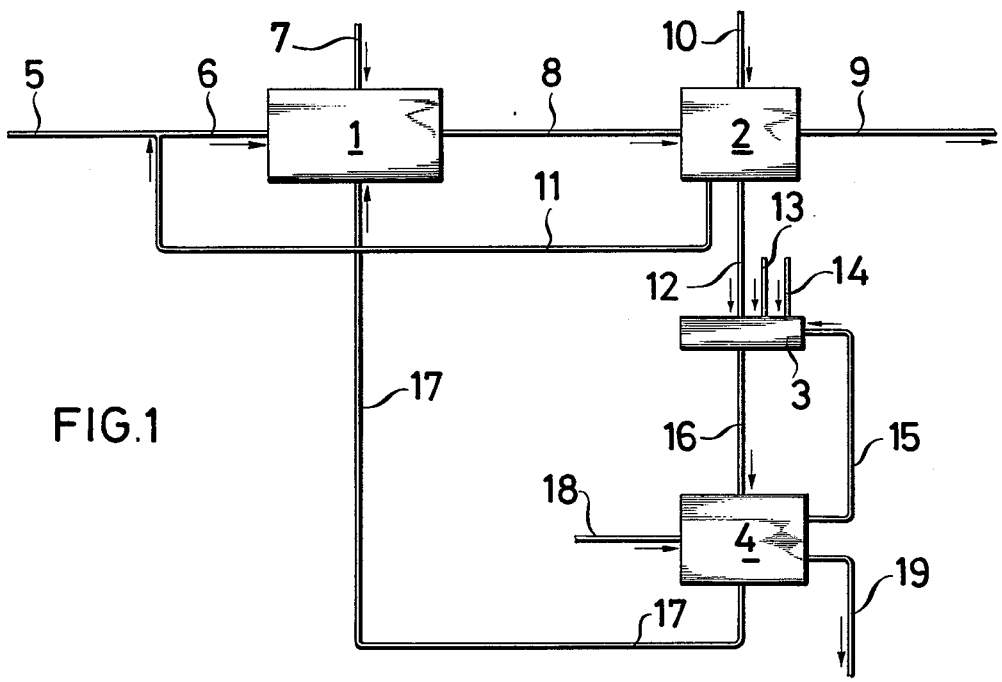

United States Patent [19]

Ehlers et al.

[11] 4,100,261

[45] Jul. 11, 1978

[54] PRODUCTION OF PURE ALKALI METAL PHOSPHATE SOLUTIONS FROM WET-PROCESSED PHOSPHORIC ACID

[75] Inventors: Klaus-Peter Ehlers, Erftstadt-Lechenich; Siegfried Lischka, Brühl-Vochem; Siegfried Burkhardt, Brühl-Kierberg, all of Fed. Rep. of Germany

[73] Assignee: Hoechst Aktiengesellschaft, Frankfurt am Main, Fed. Rep. of Germany

[21] Appl. No.: 640,772

[22] Filed: Dec. 15, 1975

[30] Foreign Application Priority Data

Dec. 23, 1974 [DE] Fed. Rep. of Germany ....... 2461064

[51] Int. Cl.² ...................... C01B 15/16; C01B 25/26
[52] U.S. Cl. ..................................... 423/309; 423/305
[58] Field of Search .......................... 423/305, 307–313

[56] References Cited

U.S. PATENT DOCUMENTS

| | | | |
|---|---|---|---|
| 3,637,346 | 1/1972 | Ehlers et al. | 423/305 |
| 3,764,655 | 10/1973 | Ehlers et al. | 423/309 |

*Primary Examiner*—Earl C. Thomas
*Assistant Examiner*—Gregory A. Heller
*Attorney, Agent, or Firm*—Connolly and Hutz

[57] ABSTRACT

Production of pure alkali metal phosphate solutions by neutralizing wet-processed phosphoric acid with an alkali liquor and/or carbonate. To this end, the wet-processed phosphoric acid is neutralized to a pH from 4 to 9, the resulting neutralization sludge consisting substantially of insoluble aluminum and iron phosphates is separated from the alkali metal phosphate solution and scrubbed with water, the sludge so treated is mixed with alkali liquor, alkali metal phosphate solution and waterglass so as to establish in the resulting suspension a molar ratio of $SiO_2$ to $Al_2O_3$ of at least 2 : 1 and a molar ratio of dissolved alkali metal oxide to dissolved $P_2O_5$ ranging from 2.9 : 1 to 3.3 : 1, the whole is heated to temperatures from 80° to 100° C to effect breakup of the sludge in the suspension with the resultant formation of a solid matter residue together with a trialkali metal phosphate solution, the solid matter residue is separated from the trialkali metal phosphate solution, water-scrubbed, and discarded. More particularly, crude wet-processed phosphoric acid containing more than 45 weight % of $P_2O_5$ is diluted with a portion of the scrubbing water obtained during operation and its $P_2O_5$-content is thereby reduced down to 30 to 45 weight %. The acid so treated is neutralized with an alkali liquor and/or carbonate and with the trialkali metal phosphate solution originating from the processed neutralization sludge.

7 Claims, 3 Drawing Figures

PRODUCTION OF PURE ALKALI METAL PHOSPHATE SOLUTIONS FROM WET-PROCESSED PHOSPHORIC ACID

The present invention relates to a process for making pure alkali metal phosphate solutions by neutralizing wet-processed phosphoric acid with an alkali liquor and/or carbonate, wherein the wet-processed phosphoric acid is neutralized so as to establish a pH-value ranging from 4 to 9, the resulting neutralization sludge consisting substantially of insoluble aluminum and iron phosphates is separated from the alkali metal phosphate solution and scrubbed with water, the sludge so treated is mixed with alkali liquor, alkali metal phosphate solution and waterglass so as to establish in the resulting suspension a molar ratio of $SiO_2$ to $Al_2O_3$ of at least 2 : 1 and a molar ratio of dissolved alkali metal oxide to dissolved $P_2O_5$ ranging from 2.9 : 1 to 3.3 : 1, the whole is heated to temperatures ranging from 80° to 100° C to effect break-up of the sludge in the suspension with the resultant formation of a solid matter residue together with a trialkali metal phosphate solution, the solid matter residue is separated from the trialkali metal phosphate solution, water-scrubbed, and discarded.

The alkali metal phosphate solutions so obtained contain an approximate proportion of from 19 to 23% of $P_2O_5$, of which 66 to 100% is in the form of disodium phosphate.

This process has been described in German Patent Specification No. 2 035 505 and enables the loss of $P_2O_5$, which accompanies the purifying neutralization of wet-processed phosphoric acid, to be reduced to a commercially acceptable limit.

With respect to the trialkali metal phosphate solution resulting from the processed neutralization sludge, it is not allowable for it to contain more than 9 – 10% of $P_2O_5$. If the $P_2O_5$ content is higher, it is substantially impossible to separate the solution from the hydroxide aluminosilicate sludge obtained therewith, without significant loss of crystallized trialkali metal phosphate solution. In other words the commercially attractive utilization of the $P_2O_5$ contained in the relatively dilute trialkali metal phosphate solution is the actual problem encountered with this known process. Two routes have been tried heretofore to achieve this, which provide:

1 for the trialkali metal phosphate solution to be concentrated to an approximate $P_2O_5$-content of 19 weight % by evaporating the water therein, and for the solution so concentrated to be re-introduced into the purification cycle at an appropriate place, or 2 for the solution to be subjected to crystallization so as to obtain a trialkali metal phosphate with an approximate $P_2O_5$-content again of 19 weight %, for the phosphate to be separated from the mother liquor and to be re-used for neutralizing crude phosphoric acid containing from 27 to 30 weight % of $P_2O_5$.

The mother liquors originating from the crystallization step contain little $P_2O_5$ and are used as diluents in processing the neutralization sludge.

The two operations last described necessitate however considerable expenditure of machinery and are difficult to carry out.

A further problem encountered with these known processes is the lack of means permitting the scrubbing water to be utilized in commercially and technically attractive fashion.

This is more particularly of a problematic nature in all those cases in which the purifying neutralization cannot be coupled with the production of the wet-processed phosphoric acid.

Wherever this can be combined, it is possible for the scrubbing water containing little $P_2O_5$ to be used for the processing of phosphate ores.

It is accordingly an object of the present invention to provide a solution for those problems.

The present invention now unexpectedly provides a process permitting the above problems to be resolved in simple manner and under commercially attractive conditions, which process comprises: using as the starting material crude wet-processed phosphoric acid containing more than 45 weight % of $P_2O_5$, diluting the acid with at least a portion of the scrubbing waters obtained during operation and thereby reducing the acid's $P_2O_5$-content down to 30 to 45 weight %, preferably 35 to 40 weight %, and neutralizing the acid so treated with an alkali liquor and/or carbonate and with the trialkali metal phosphate solution originating from the processed neutralization sludge.

Preferred features of the present process provide for the scrubbing water containing relatively high proportions of $P_2O_5$ to be used for diluting the crude wet-processed phosphoric acid, and for the scrubbing water containing relatively low proportions of $P_2O_5$ to be used for processing the neutralization sludge. It is even more preferable for the water employed for scrubbing the separated neutralization sludge to be used for diluting the crude wet-processed phosphoric acid, and for the water employed for scrubbing the solid matter residue, which originates from the processed neutralization sludge, to be used again for processing the neutralization sludge. It is also possible to neutralize the crude wet-processed phosphoric acid stepwise. To this end, the acid is initially neutralized to some extent by means of the alkali liquor and/or carbonate and then neutralized to the extent desired by means of the trialkali metal phosphate solution. It is good practice to neutralize the acid in the first step up to a stage beyond the monoalkali metal phosphate and, in the second step, to go ahead with the neutralization approximately up to the dialkali metal phosphate stage. In those cases in which the neutralization is effected stepwise, it is advantageous for the neutralized matter to be freed, after each step, from the resulting neutralization sludges, for each of the two sludges to be scrubbed with water and to be processed jointly, and for the two scrubbing waters to be united and used for diluting the crude wet-processed phosphoric acid.

It is sometimes sufficient for the two neutralization sludges to be subjected jointly to a single step filtration, after the second neutralization step. The invention also provides for the trialkali metal phosphate solution, which comes from the processed neutralization sludge, to be used for neutralizing a proportion (or partial stream) of the dilute crude wet-processed phosphoric acid, for the resulting precipitate to be separated, scrubbed and discarded, for the scrubbing water to be used, together with the water employed for scrubbing the neutralization sludge, for diluting the crude wet-processed phosphoric acid, and for the neutralized matter to be used for further partial neutralization of the balance (bulk) proportion of the dilute crude or partially neutralized acid.

In effecting such partial neutralization, it is good practice to go ahead with the neutralization up to the degree targeted for the purified principal solution. It is more particularly good practice to subject two separate streams of crude acid to the neutralization in parellel if the acid to undergo purification contains contaminants, such as vanadium, for example, where it is not allowable for the acid to be neutralized beyond a certain relatively low degree so as to ensure the successful transformation of the contaminants into insoluble matter which can be removed.

To avoid difficulties during the filt-ration of the hydroxide alumino-silicate sludge and unnecessary loss of $P_2O_5$, it is advantageous for the water used for scrubbing the solid matter residue coming from the neutralized sludge, to be recycled in the proportions necessary to produce a trialkali metal phosphate solution containing from 4 to 10 weight %, preferably 8 to 9 weight % of $P_2O_5$.

The process of the present invention offers a series of unexpected beneficial effects.

It enables highly concentrated commercial phosphoric acids to be purified by an operation which is closed in itself and is in no way affected by the particular process used for making the wet-processed phosphoric acid. It produces sodium phosphate solutions with a purity and concentration not obtainable heretofore by prior art methods. In addition to this, it enables high $P_2O_5$-yields to be produced under commercially really attractive conditions. Still further, it is easy to carry out with little expenditure of machinery.

The operation in a closed cycle is more particularly made possible by the fact that all of the individual partial streams formed in the present process are circulated in technically reasonable manner. Of special importance is the fact that it is possible, for example, for the scrubbing waters coming from the individual filtration stages to be divided into two streams, of which one contains a relatively low, and the other contains a relatively high, proportion of $P_2O_5$.

It is advantageous for the crude acid which is to undergo neutralization to be used in the concentration necessary to provide for the addition of the alkali and trialkali metal phosphate solution thereto and for the separation of neutalized sludge precipitate therefrom with the resultant formation of a purified solution which contains from 26 to 19 weight % of $P_2O_5$, depending on whether the solution is a monoalkali or dialkali metal phosphate solution or a mixed solution of the two phosphates. In those cases in which large quantities of trialkali metal phosphate solution are obtained, e.g. in the treatment of strongly contaminated crude acids, the crude acid to undergo neutralization should preferably contain $P_2O_5$ in a proportion approaching the upper limiting value within the proposed range of from 30 to 45 weight %. In other words it is necessary for the filtered sludge to be scrubbed with relatively small quantities of water. Inversely, it is possible to increase the quantity of scrubbing water and thereby to reduce the $P_2O_5$-concentration in the crude acid down to approximately 35 weight %, for example.

The following Examples illustrate the invention. For ease in understanding the invention, reference is made in the Examples to the flow schemes shown in the accompanying drawings. The percentages are by weight unless otherwise stated.

EXAMPLE 1:

(The reference numerals put into brackets relate to FIG. 1 of the accompanying drawings).

The starting material was wet-processed phosphoric acid prepared from Yousoufia phosphate. The acid contained 46.9% of $P_2O_5$, 0.50% of $SO_4^{2-}$, 0.32% of $F^-$, 0.23% of $FE^{3+}$, 0.15% of $Al^{3+}$, 0.41% of $Mg^{2+}$, 0.15% of $Ca^{2+}$, 0.06% of $Cr^{3+}$ and 0.051% of $V^{4+}$. 1470 kg of crude acid travelling through line (5) was diluted with 592 kg of recycled scrubbed filtrate containing 7.5% of $P_2O_5$, travelling through line (11) and originating from the scrubbing of neutralized sludge. 2062 kg of phosphoric acid containing 33.5% of $P_2O_5$ was formed, which was conveyed through line (6) to a neutralization vessel (1), in which it was admixed with 1167 kg of a trisodium phosphate solution containing 8.2% of $P_2O_5$, travelling through line (17) and being obtained on converting neutralized sludge into a hydroxide-aluminosilicate sludge, and also admixed with 1200 kg of a 50% sodium hydroxide solution coming from line (7). The mixture so obtained was stirred at 80° C, conveyed through a line (8) to a pressure filter (2) and filtered therein. The filter cake was scrubbed with 500 l of fresh water. 3730 kg of final product, which was a disodium phosphate solution containing 19.5% of $P_2O_5$, was obtained in line (9). There was also obtained 592 kg of scrubbing water (in line(11)) and 425 kg of neutralized sludge containing 51.9% of $H_2O$ and 49.7% of $P_2O_5$ in the dry substance (in line (12)). The neutralized sludge was delivered to a processing container (3), treated therein with 240 kg of a 50% sodium hydroxide solution (coming from line (13)), 75 kg of water-glass (coming from line (14)) and 563 kg of recycled scrubbing water (through line (15)) and transformed at 85° – 95° C into hydroxide-aluminosilicate sludge poor in $P_2O_5$.

The suspension was delivered through line (16) to a pressure filter (4), filtered therein and the resulting filter cake was scrubbed with 560 kg of fresh water travelling through line (18). There were obtained 1167 kg of a trisodium phosphate solution containing 8.2% of $P_2O_5$ (in line (17)), 563 kg of scrubbing water containing 1.6% of $P_2O_5$ (in line (15)) and 177 kg of a solid residue containing 62.5% of $H_2O$ and 22.9% of $P_2O_5$ in the dry substance (in line (19)), which was discarded. The scrubbing water conveyed through line (15) was recycled to container (3) and used for diluting the neutralization sludge therein, whilst the trisodium phosphate solution was used for neutralizing further crude acid. The total loss of $P_2O_5$ was 2.53% based on the crude acid used.

EXAMPLE 2

Figure 2:
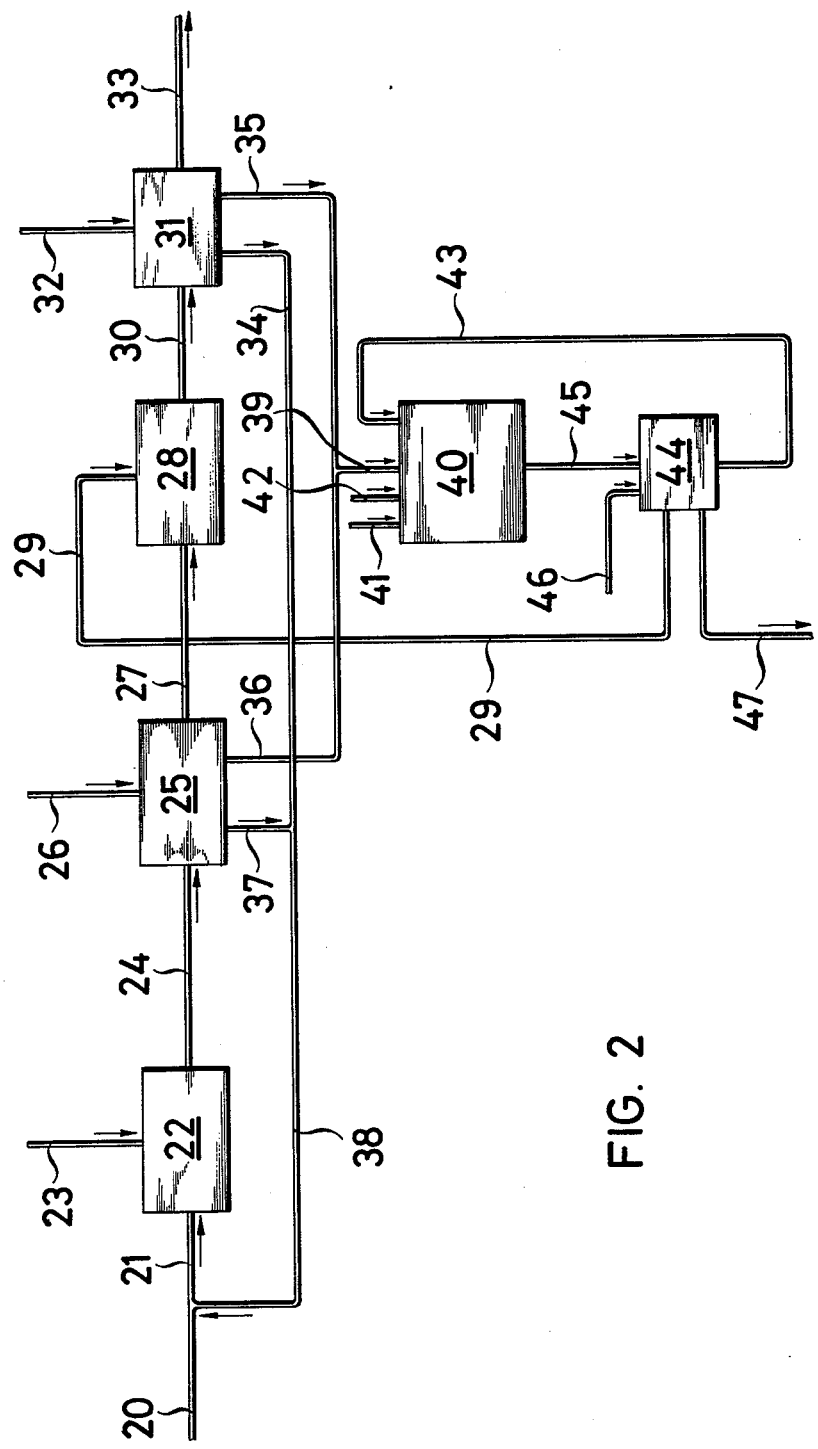

(The reference numerals put into brackets relate to FIG. 2 of the accompanying drawings)

The starting material was wet-processed phosphoric acid prepared from Khouribga phosphate. The acid contained 49% of $P_2O_5$, 0.47% of $SO_4^{2+}$, 0.51% of $F^+$, 0.25% of $Fe^{3+}$, 0.30% of $Al^{3+}$, 0.31% of $Mg^{2+}$, 0.05% of $Ca^{2+}$, 0.003% of $Cr^{3+}$ and 0.024% of $V^{4+}$. 1603 kg of the crude acid travelling through line (20) was diluted with 579 kg of water used for scrubbing the neutralization sludges. The scrubbing water contained 7.3% of $P_2O_5$ and was conveyed through line (38). The resulting product was phosphoric acid containing 37.9% of $P_2O_5$. It was delivered through line (21) to container (22) and neutralized therein by admixing it with 1584.7 kg of a 50% sodium hydroxide solution coming from line (23). The resulting neutralized suspension was conveyed through line (24) to a pressure filter (25) and filtered therein. The filter cake was separated and scrubbed with 550 l of fresh water coming from line (26). There were obtained (in line (27)) 2968 kg of a sodium phosphate solution containing 23.3% of $P_2O_5$ and having a $Na_2O:P_2O_5$ molar ratio of 1.84:1, together with (in line (37)) 555 kg of scrubbing water and (in line (36)) 394 kg of neutralization sludge containing 94.2 kg of $P_2O_5$. The sodium phosphate solution was delivered through line (27) to container (28) and neutralized therein by admixing it with 930 kg of trisodium phosphate solution containing 8.1% of $P_2O_5$ and being recirculated through line (29). The resulting suspension was delivered through line (30) to a second pressure filter (31) and filtered therein.

The filter cake was scrubbed with 24 kg of fresh water coming through line (32). The end product obtained in line (33) was 3875 kg of disodium phosphate solution containing 19.7% of $P_2O_5$. It was obtained together with 24 kg of scrubbing water containing 7.5% of $P_2O_5$ and travelling through line (34) and 23.3 kg of neutralized sludge containing 4 kg of $P_2O_5$.

The scrubbing waters flowing through lines (34) and (37), respectively, were combined, circulated and used for diluting concentrated crude acid. The neutralization sludges in lines (35) and (36), respectively, were united in line (39), delivered to a processing vessel (40) and treated therein at 85° – 95° C with 1798 kg of a 50% sodium hydroxide solution travelling through line (41), 34 kg of water-glass coming from line (42), and 466 kg of water used for scrubbing the hydroxide aluminosilicate sludge and travelling through line (43).

The product so treated was conveyed through line (45) to a third pressure filter (44) and filtered therein. The filter cake was separated and scrubbed with 514 kg of fresh water coming from line (46). 930 kg of a trisodium phosphate solution containing 8.1% of $P_2O_5$ was obtained in line (29) which was used for neutralizing crude acid partially neutralized with sodium hydroxide solution and coming from lines (27) and (28), respectively. There were also obtained 466 kg of scrubbing water containing 3.0% of $P_2O_5$ ( in line (43)) which was recirculated and added as diluent to the material in processing vessel (40), and 192 kg of hydroxide aluminosilicate sludge containing 18.9 kg of $P_2O_5$, which was discarded. The loss of $P_2O_5$ was 2.4%, based on the overall $P_2O_5$-content of the crude acid used.

EXAMPLE 3

Figure 3:
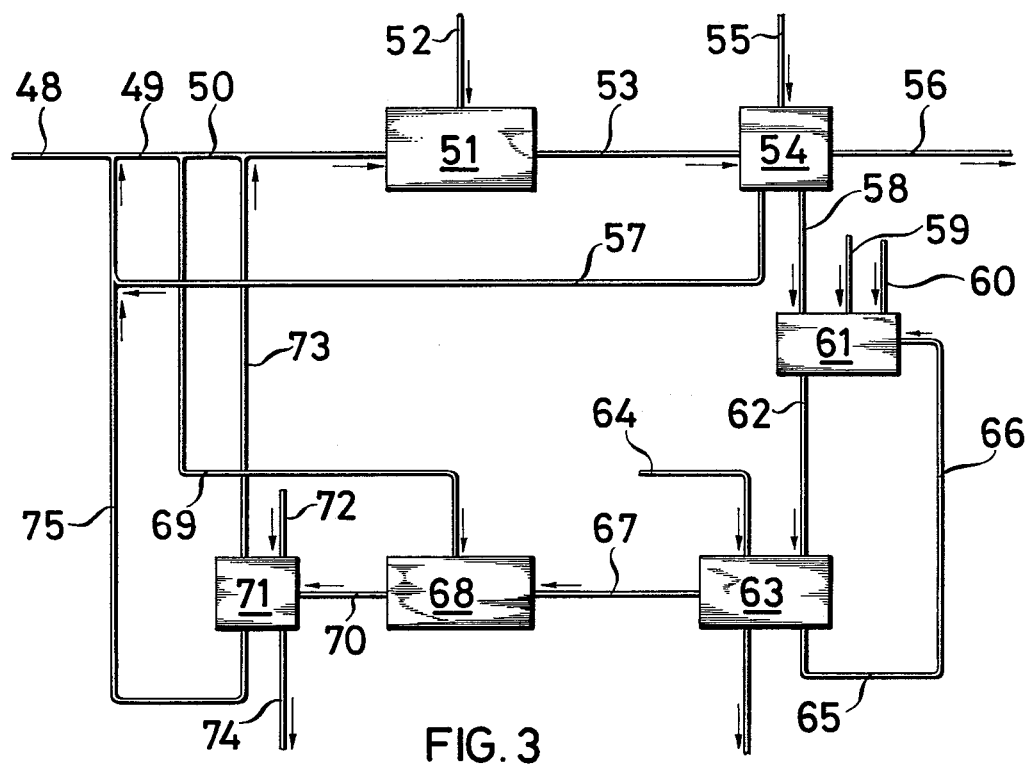

(The reference numerals put into brackets relate to FIG. 3 of the accompanying drawings).

Crude phosphoric acid prepared from Youssoufia phosphate and the same as that described in Example 1 was the starting material. 978 l of the acid was conveyed through line (48) and diluted with 500 l of scrubbing water containing 7.1% of $P_2O_5$. This was water, which had been used for scrubbing the neutralization sludges and which travelled through line (76). The resulting phosphoric acid stream travelling through line (49) contained 35.5% of $P_2O_5$. The stream was subdivided into two partial streams (50) and (69), respectively. 1325 l of the acid travelling through line (50) was admixed with 100 l of a filtered solution containing 13.2% of $P_2O_5$ and travelling through line (73). This was a solution, which had been used for neutralizing the trisodium phosphate solution coming from line (73) and for neutralizing the partial stream of crude acid conveyed through line (69). This resulted in the formation of a pre-dilute and pre-neutralized crude acid containing 26% of $P_2O_5$, which was delivered to a tank (51) and neutralized therein with 800 l of a 50% sodium hydroxide solution (coming from line (52)) up to the disodium phosphate stage. The resulting suspension was conveyed through line (53) to pressure filter (54) and filtered therein. 2560 l of filtrate containing 19.5% of $P_2O_5$ was obtained as the final product, in line (56). The filter cake was scrubbed in pressure filter (54) with 400 l of water supplied through line (55), and 354 l of scrubbing water containing 7.5% of $P_2O_5$ was obtained in line (57). 450 kg of filter cake containing 102 kg of $P_2O_5$ was obtained in line (58). The filter cake was delivered to a processing vessel (61), treated therein with a 50% sodium hydroxide solution coming from line (59), 54.5 l of water-glass coming from line (60) and 563 l of scrubbing water coming from line (66) and thereby converted into a suspension travelling through line (62) and consisting of hydroxide alumino silicate sludge and a trisodium phosphate solution. In a second pressure filter (63), the suspension was separated into solid matter and liquid matter and the solid matter was scrubbed with 550 l of water coming from line (64).

There were obtained (in line (65)) 177 kg of hydroxide alumino silicate sludge containing 15 kg of $P_2O_5$, (in line (67)) 960 l of a trisodium phosphate solution containing 8.2% of $P_2O_5$ and (in line (66)) 563 l of scrubbing water. The scrubbing water travelling through line (66) was recirculated and added as a diluent to the material to be processed by neutralization, as described hereinabove. The trisodium phosphate solution travelling through line (67) was delivered to the second neutralization vessel (68) and neutralized therein up to pH 6.5 by means of 195 l of the partial stream of acid conveyed through line (69). The resulting neutralized product was conveyed through line (70) to a third pressure filter (71), separated into solid matter and liquid matter therein, and the solid matter was scrubbed with 130 l of water coming from line (72).

There were obtained (in line (73)) 1000 l of neutralized material containing 13.2% of $P_2O_5$ and (in line (74)) 100 kg of moist residue containing 4.5 kg of $P_2O_5$ and 146 l of scrubbing water containing 5% of $P_2O_5$. The scrubbing water, which travelled through line (75) was united with the scrubbing water used in the first neutralization stage (57) and the combined water was conveyed through line (76) and added as diluent to the crude acid in line (48). The neutralized material in line (73) was used to pre-neutralize and pre-dilute the partial stream of acid travelling through line (50), as described hereinabove. The hydroxide aluminosilicate sludge in line (65) and the second neutralization sludge in line (74) were discarded. Altogether 3.25% of $P_2O_5$, based on the $P_2O_5$ in the crude phosphoric acid used, was lost.

We claim:

1. In the process for making pure alkali metal phosphate solutions by neutralizing wet-processed phosphoric acid with alkali metal hydroxides, carbonates and mixtures thereof, wherein the wet-processed phosphoric acid is neutralized so as to establish a pH-value ranging from 4 to 9, the resulting neutralization sludge consisting substantially of insoluble aluminum and iron phosphates is separated from the alkali metal phosphate solution and scrubbed with water, the sludge so treated is mixed with an alkali metal hydroxide, alkali metal phosphate solution and water-glass so as to establish in the resulting suspension a molar ratio of $SiO_2$ to $Al_2O_3$ of at least 2 : 1 and a molar ratio of dissolved alkali metal oxide to dissolved $P_2O_5$ ranging from 2.9 : 1 to 3.3 : 1, the whole is heated to temperatures ranging from 80° to 100° C to effect breakup of the sludge in the suspension with the resultant formation of a solid matter residue together with a trialkali metal phosphate solution, solid matter residue is separated from the trialkali metal phosphate solution, water-scrubbed, and discharged, the improvement which comprises using as starting material crude wet-processed phosphoric acid containing more than 45 weight % of $P_2O_5$, diluting the acid with the water employed for scrubbing the separated neutralization sludge and thereby reducing the acid's $P_2O_5$-content down to 30 to 45 weight %, neutralizing the acid so diluted with alkali metal hydroxides, carbonates and mixtures thereof and with the trialkali metal phosphate solution originating from the processed neutralization sludge, and using the scrubbing water derived by scrubbing the solid matter residue of the breakup of the neutralization sludge as alkali metal solution which is mixed with the water-glass, alkali metal hydroxide and neutralization sludge.

2. The process as claimed in claim 1, wherein the crude wet-processed phosphoric acid is diluted so as to reduce its $P_2O_5$-content down to 35 to 40 weight %.

3. The process as claimed in claim 1, wherein the crude wet-processed phosphoric acid is neutralized stepwise by initially neutralizing the acid partially by means of the compound selected from the group consisting of alkali metal hydroxides, carbonates, and mixtures thereof and then neutralizing it to the extent desired by means of the trialkali metal phosphate solution.

4. The process as claimed in claim 3, wherein the neutralized matter is freed, after each neutralization step, from the resulting neutralization sludges, each of the two sludges is scrubbed with water and processed jointly, and the two scrubbing waters are united and used for diluting the crude wet-processed phosphoric acid.

5. The process as claimed in claim 1, wherein the trialkali metal phosphate solution coming from the processed neutralization sludge is used for neutralizing a proportion of the dilute crude wet-processed phosphoric acid, the resulting precipitate is separated, scrubbed and discarded, the resulting scrubbing water is used together with the water employed for scrubbing the neutralization sludge, for diluting the crude wet-processed phosphoric acid, and the neutralized matter is used for partially neutralizing the balance portion of the dilute crude acid.

6. The process as claimed in claim 1, wherein the water used for scrubbing the solid matter residue coming from the neutralized sludge is recycled in the proportions necessary to produce a trialkali metal phosphate solution containing from 4 to 10 weight % of $P_2O_5$.

7. The process as claimed in claim 6, wherein the scrubbing water is recycled in the proportions necessary to produce a trialkali metal phosphate solution containing from 8 to 9 weight % of $P_2O_5$.

* * * * *